(12) United States Patent
Fix et al.

(10) Patent No.: US 10,607,194 B2
(45) Date of Patent: Mar. 31, 2020

(54) METHOD AND APPARATUS FOR MANAGING MAINTENANCE FOR A SERVICE PROVIDER

(71) Applicants: AT&T Intellectual Property I, LP, Atlanta, GA (US); AT&T Mobility II LLC, Atlanta, GA (US)

(72) Inventors: Jeremy Fix, Acworth, GA (US); George Goehring, Decatur, GA (US); Michael Lugo, Atlanta, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 759 days.

(21) Appl. No.: 14/526,768

(22) Filed: Oct. 29, 2014

(65) Prior Publication Data
US 2016/0125365 A1   May 5, 2016

(51) Int. Cl.
*G06Q 50/32* (2012.01)
*G06Q 10/00* (2012.01)
*G06Q 50/10* (2012.01)

(52) U.S. Cl.
CPC ............ *G06Q 10/20* (2013.01); *G06Q 50/10* (2013.01); *G06Q 50/32* (2013.01)

(58) Field of Classification Search
CPC .................................................. G06Q 10/00
See application file for complete search history.

(56) References Cited

U.S. PATENT DOCUMENTS

| | | | |
|---|---|---|---|
| 6,445,774 B1 | 9/2002 | Kidder et al. | |
| 6,671,824 B1 | 12/2003 | Hyland et al. | |
| 6,771,739 B1 | 8/2004 | Beamon et al. | |
| 7,032,016 B2 | 4/2006 | Cerami et al. | |
| 7,134,135 B2 | 11/2006 | Cerami et al. | |
| 7,333,593 B2 | 2/2008 | Beamon et al. | |
| 7,693,079 B2 | 4/2010 | Cerami et al. | |

(Continued)

OTHER PUBLICATIONS

Jin, Yu et al., "NEVERMIND, the Problem is Already Fixed: Proactively Detecting and Troubleshooting Customer DSL Problems", ACM CoNEXT, Philadelphia, USA, Nov.-Dec. 2010, 12 pages.

*Primary Examiner* — Jan P Mincarelli
(74) *Attorney, Agent, or Firm* — Guntin & Gust, PLC; Jay Anderson

(57) ABSTRACT

Aspects of the subject disclosure may include, for example, obtaining device diagnostic data for a group of devices that provide communication services to a plurality of customer premises of a plurality of users over a network, obtaining configuration data associated with the plurality of customer premises, obtaining quality key performance indicators associated with the communication services of the plurality of customer premises, applying linear regression to the device diagnostic data, the configuration data and the quality key performance indicators to identify a quality threshold based on a particular configuration, detecting a subset of customer premises from among the plurality of customer premises that are not satisfying the quality threshold, and analyzing a subset of the device diagnostic data that corresponds to the subset of customer premises to determine equipment associated with the subset of customer premises for maintenance. Other embodiments are disclosed.

20 Claims, 6 Drawing Sheets

(56) References Cited

U.S. PATENT DOCUMENTS

| | | | |
|---|---|---|---|
| 7,974,387 B2 | 7/2011 | Lutz et al. | |
| 8,209,218 B1 * | 6/2012 | Basu | G06Q 10/0637 |
| | | | 705/7.36 |
| 8,484,511 B2 | 7/2013 | Tidwell et al. | |
| 8,793,363 B2 | 7/2014 | Sater et al. | |
| 2005/0097396 A1 | 5/2005 | Wood | |
| 2007/0041554 A1 | 2/2007 | Newman | |
| 2008/0267076 A1 | 10/2008 | Laperi et al. | |
| 2012/0078894 A1 * | 3/2012 | Jiang | G06F 17/30743 |
| | | | 707/723 |
| 2013/0262656 A1 | 10/2013 | Cao et al. | |
| 2014/0130111 A1 | 5/2014 | Nulty et al. | |
| 2014/0140494 A1 * | 5/2014 | Zhakov | H04M 3/5175 |
| | | | 379/265.03 |

\* cited by examiner

200

METHOD AND APPARATUS FOR MANAGING MAINTENANCE FOR A SERVICE PROVIDER

FIELD OF THE DISCLOSURE

The subject disclosure relates to a method and apparatus for managing maintenance for a service provider.

BACKGROUND

Customers can have varying requirements for an expected quality of service. Degradations in the quality of service can be identified by the customer, which then typically results in self-troubleshooting, calls to the service provider, and ultimately a dispatch by a technician to the customer premises. The amount of time that a customer spends engaging with service provider personnel and experiencing the quality issue can increase the likelihood of the customer obtaining service from a different provider and can reduce the customer's willingness to recommend the service to others.

BRIEF DESCRIPTION OF THE DRAWINGS

Reference will now be made to the accompanying drawings, which are not necessarily drawn to scale, and wherein.

DETAILED DESCRIPTION

Figure 1:
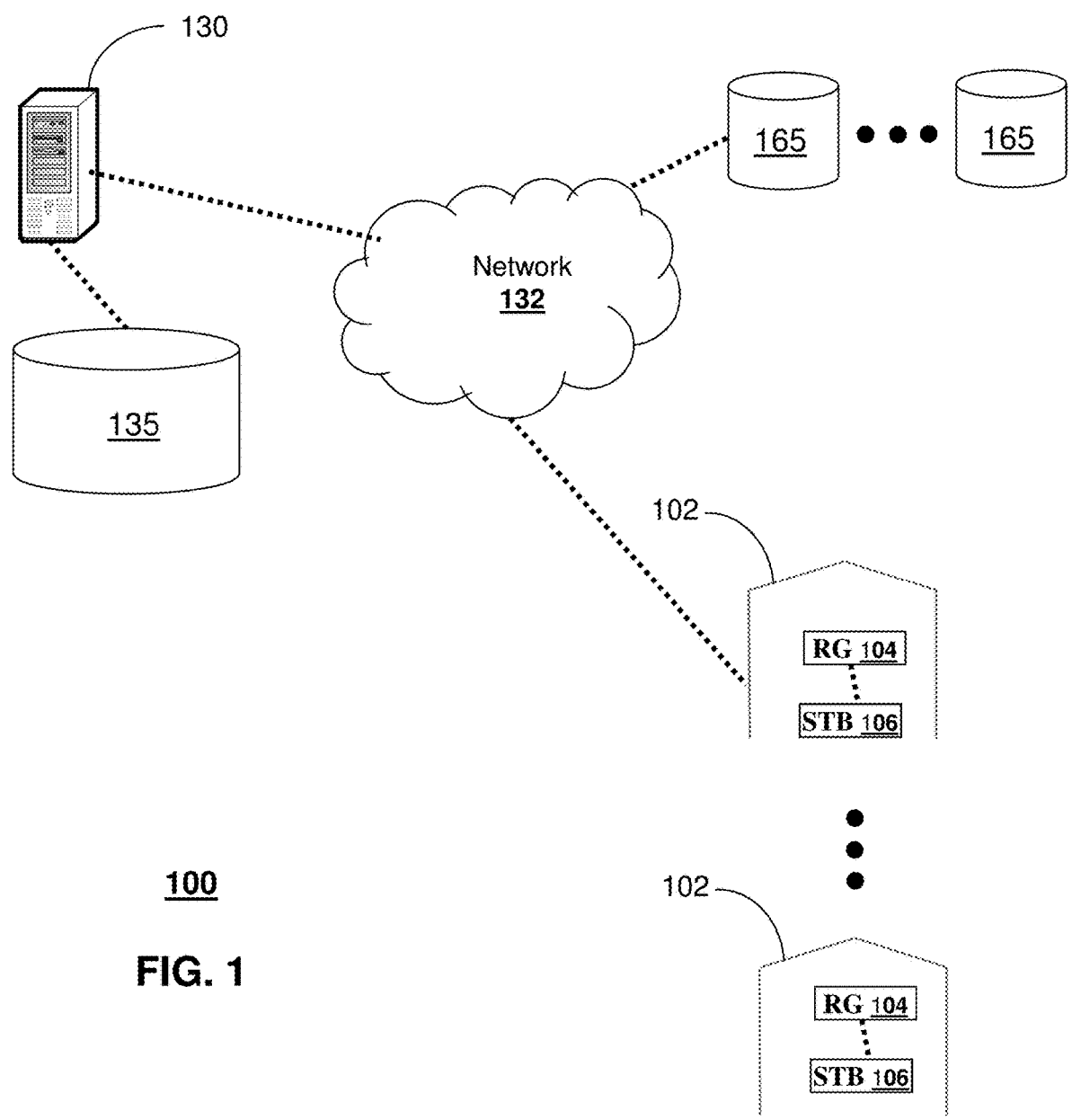
FIG. 1 depicts an illustrative embodiment of a system that manages maintenance of equipment used in providing communication services.

The subject disclosure describes, among other things, illustrative embodiments for analyzing data associated with providing communication services to users and managing maintenance of equipment utilized in the providing of those communication services. Predictive analytics can be applied to the data to characterize a desired quality of service for particular configurations for a customer premises. Outliers (e.g., customer premises) that are not satisfying the desired quality of service can be further examined, including determining the equipment causing the drop below a threshold quality and maintenance can be performed on that equipment. The exemplary embodiments can provide for prescriptive maintenance dispatch actions according to linear regression applied to the data.

One or more aspects of the subject disclosure include monitoring for and detecting quality degradations to a customer device level and proactively maintaining or repairing those devices which fall below a determined quality threshold. Various data, such as historical trends, customer care calls, dispatch ticket history, and/or configuration data can be analyzed, such as via linear regression or other predictive analytic techniques in conjunction with quality key performance indicators to prescribe future actions and reduce time to resolution.

One embodiment of the subject disclosure is a method that includes obtaining, by a system including a processor, device diagnostic data for a group of devices that provide communication services to a plurality of customer premises of a plurality of users over a network. The method includes obtaining, by the system, call records associated with maintenance for the plurality of customer premises. The method includes obtaining, by the system, dispatch records associated with site visits for the plurality of customer premises. The method includes obtaining, by the system, historical records associated with service performance of the plurality of customer premises. The method includes obtaining, by the system, configuration data associated with the plurality of customer premises. The method includes obtaining, by the system, quality key performance indicators associated with the communication services of the plurality of customer premises. The method includes applying, by the system, linear regression to the device diagnostic data, the call records, the dispatch records, the historical records, the configuration data and the quality key performance indicators to identify a quality threshold based on a particular configuration. The method includes detecting, by the system, a subset of customer premises from among the plurality of customer premises that are not satisfying the quality threshold. The method includes analyzing, by the system, a subset of the device diagnostic data that corresponds to the subset of customer premises to determine equipment associated with the subset of customer premises for maintenance.

One embodiment of the subject disclosure includes a server with a processor and a memory that stores executable instructions that, when executed by the processor, facilitate performance of operations, including obtaining device diagnostic data for a group of devices that provide communication services to a plurality of customer premises of a plurality of users over a network. The server can obtain configuration data associated with the plurality of customer premises and can obtain quality key performance indicators associated with the communication services of the plurality of customer premises. The server can apply linear regression to the device diagnostic data, the configuration data and the quality key performance indicators to identify a quality threshold based on a particular configuration. The server can detect a subset of customer premises from among the plurality of customer premises that are not satisfying the quality threshold. The server can analyze a subset of the device diagnostic data that corresponds to the subset of customer premises to determine equipment associated with the subset of customer premises for maintenance. The server can determine a history of dispatch repair for the plurality of customer premises. The server can determine corrective actions for the equipment of the subset of customer premises according to the history of dispatch repair.

One embodiment of the subject disclosure includes a machine-readable storage device, comprising executable instructions that, when executed by a processor, facilitate performance of operations, including obtaining device diagnostic data for a group of devices that provide communication services to a plurality of customer premises of a plurality of users over a network. The processor can obtain dispatch records associated with site visits for the plurality of customer premises, and can obtain configuration data associated with the plurality of customer premises. The processor can obtain quality key performance indicators associated with the communication services of the plurality of customer premises. The processor can apply linear regression to the device diagnostic data, the dispatch records, the configuration data and the quality key performance indicators to identify a quality threshold based on a particular configuration. The processor can detect a subset of customer premises from among the plurality of customer premises that are not satisfying the quality threshold. The processor can analyze a subset of the device diagnostic data that corresponds to the subset of customer premises to determine equipment associated with the subset of customer premises for maintenance. The processor can evaluate a success of corrective actions for the equipment of the subset of customer premises. The processor can revise the dispatch records according to the evaluation.

FIG. 1 depicts an illustrative embodiment of a system 100 that enables managing equipment maintenance for a service provider that provides communication services to any number of customer premises 102 (e.g., a residence, a building, or any other location to which communication services are provided by the service provider) over a network 132. The communication services can be of various types including voice, video, data and/or messaging. The particular provider equipment utilized for providing the services can vary and can include routers, switches, servers, hardwires, wireless devices, and so forth.

System 100 can include one or more servers 130 that can merge or otherwise process large datasets which can be obtained or retrieved from various systems 165, such as within a service provider's network. In one embodiment, the server 130 can store in a database 135 analyzed data (e.g., obtained from the systems 165) to facilitate management of maintenance for the network, including maintenance on user devices such as media devices (e.g., set top box (STB) 106) and gateways (e.g., residential gateway (RG) 104). In one embodiment, the server 130 can be multiple servers that operate in a distributed environment where functions are divided amongst the different servers to increase processing efficiency.

The datasets can include various device diagnostic data, such as STB counters, broadband diagnostic logs, RG counters, VDSL counters, and/or STB WAP counters. The various counters can be based on various performance monitoring including dropped packets, user activity, or other quality or performance metrics that can be quantified and/or counted at the particular device or in associated with the particular device. In one embodiment, the datasets can include dispatch logs from technician site visits, customer care call logs, and/or historical trends of scorecard data that describes service or maintenance performance. In another embodiment, the server 130 can obtain configuration data associated with the customer premises 102 including types of connections (e.g., twisted pair, fiber-to-the-node, fiber-to-the-curb, fiber-to-the-home, co-axial, wireless, and so forth) and/or devices utilized in those connections (e.g., digital subscriber line access multiplexers (DSLAMs), routers, switches, and so forth).

As the datasets are merged, predictive analytics (e.g., linear regression analysis) can be applied to characterize (e.g., quantify) the quality of a customer's experience for the communications service. For instance, the customer's experience can be characterized based on a specific configuration in effect at a customer site, such as in conjunction with the central office resources allocated (e.g., DSLAM LT cards). For instance, a first quality threshold can be determined for STB's of a first type that are connected to the network via a co-axial conduit while a second quality threshold can be determined for STB's of a second type that are connected to the network via a fiber-to-the-node connection. The particular number of configurations can vary. In one embodiment, similar configurations can be merged such as STB's of a first type that are connected to the network via a fiber-to-the curb connection and STB's of the same first type that are connected to the network via a fiber-to-the-home connection. Whether or not similar configurations are merged can depend on an analysis of their similarities and whether the differences in the configuration significantly contribute to a distinction in quality of services. For example, it may be determined that fiber-to-the-curb compared with fiber-to-the-home does not significantly change the quality of service.

As the baseline for the customer experience is established via the predictive analytics applied to the data sets by the server 130, outlier detection can be performed to identify specific customer premises where the provided services are not meeting the expectation.

For example, the server 130 can apply linear regression to the dataset and, in conjunction with quality Key Performance Indicators (KPIs), can determine a quality threshold for a particular configuration. Based on this threshold, the server 130 can detect particular customer premises 102 with the particular configuration where the rendered communications services are not satisfying the quality threshold. In one embodiment, those customer premises can then be further assessed, such as according to individual counter assessments, to determine which specific pieces of equipment are faulty or are otherwise providing services that fall below the quality threshold, such as the RG 104, the STB 106, conduit to the premises and so forth. Faulty equipment detection can be used by the server 130 to proactively and prescriptively dispatch maintenance, which may essentially improve a customer's dispatch and repair experience, including reducing customer care calls, customer self-troubleshooting and a customer's exposure to below-threshold quality of services.

In one embodiment, specific prescriptive actions can be derived by the server 130 from historical dispatch repair and outlier detected issues to correlate corrective actions to specific outlier detected degradations. The prescriptive model paired with the proactive dispatch can reduce troubleshooting efforts by the site technician and can ensure the technician arrives with the most likely equipment needed which can include those items with the highest probability for the identified problem.

In one embodiment, the server 130 can obtain device diagnostic data for a group of devices that provide communication services to a plurality of customer premises 102 over the network 132. The server 130 can obtain configuration data associated with the plurality of customer premises 102 and can obtain quality KPIs associated with the communication services of the plurality of customer premises. The quality KPI's can be of various types including based on video, broadband and/or voice services quality, such as obtained via customer surveys, counters, and so forth.

The server 130 can apply linear regression to the device diagnostic data, the configuration data and the quality KPIs to identify a quality threshold (e.g., a quality baseline) based on a particular configuration. The server 130 can detect a subset of customer premises from among the plurality of customer premises 102 that are not satisfying the quality threshold. The server 130 can analyze a subset of the device diagnostic data that corresponds to the subset of customer premises to determine equipment (e.g., STB 106 or RG 104)

associated with the subset of customer premises for maintenance. The server 130 can determine a history of dispatch repair for the plurality of customer premises (or a portion thereof) and can determine corrective actions for the equipment of the subset of customer premises according to the history of dispatch repair. In one or more embodiments, the corrective action can be on user equipment that is functioning but is not functioning to provide services that meet the desired quality threshold. The corrective action can be equipment repair, equipment replacement, equipment reconfiguration, software updates, and so forth.

In one embodiment, the server 130 can obtain call records associated with maintenance for the plurality of customer premises 102 and can further apply the linear regression to the call records. In one embodiment, the server 130 can evaluate a success of the corrective actions for the equipment of the subset of customer premises and can revise dispatch records according to the evaluating, where the linear regression is applied to the dispatch records. In one embodiment, the device diagnostic data can include one or more of set top box counter data, residential gateway counter data, very-high-bit-rate digital subscriber line counter data, or wireless access point counter data.

In one embodiment, the configuration data can describe a hardwire connection (e.g., coaxial, fiber-to-the-node, fiber-to-the-curb, and so forth) used by the plurality of customer premises 102. In one embodiment, the server 130 can generate a dispatch notice identifying the corrective action and customer premises of the subset of customer premises where the maintenance is to occur. In one embodiment, the server 130 can obtain dispatch records associated with site visits for the plurality of customer premises, where the linear regression is applied to the dispatch records. In one embodiment, the server 130 can obtain historical records associated with service performance of the plurality of customer premises, where the linear regression is applied to the historical records.

Figure 2:
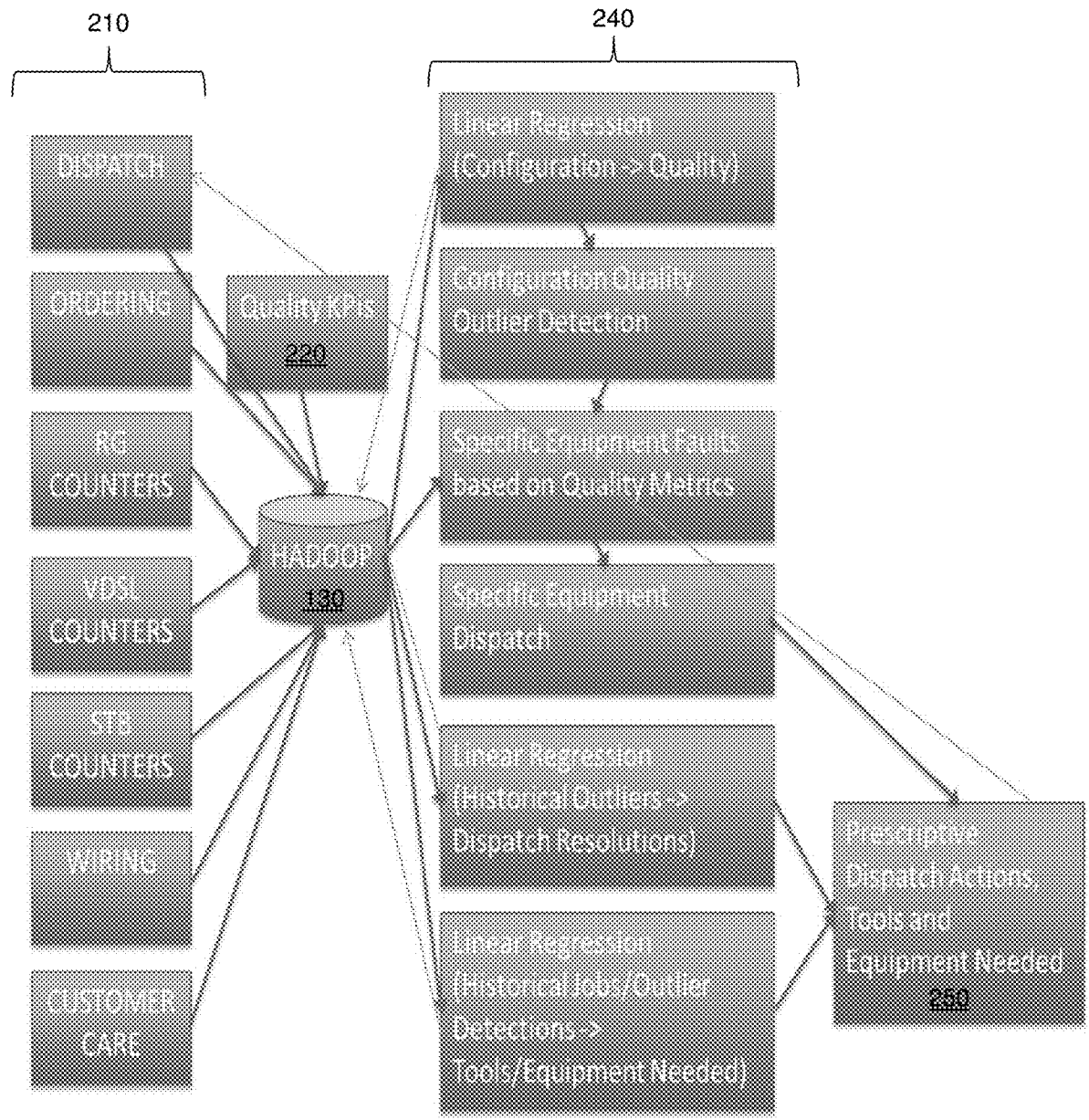
FIG. 2 depicts an illustrative embodiment of data flow in the system of FIG. 1.

FIG. 2 depicts an illustrative embodiment of data collection by the server 130 resulting in prescriptive dispatch actions. Server 130 can obtain (e.g., from different systems and/or devices) various data 210 which can include one or more of dispatch records, ordering data, RG counters, VDSL counters, STB counters, wiring configurations, or customer care calls. Server 130 can also obtain quality KPIs 220 which can be static or can be dynamic changing over time, such as based on changing demographics of the users that may have different perceptions of quality than other users corresponding to other demographics. The server 130 then can perform one or more of the steps 240 to engage in predictive analytics (e.g., via linear regression analysis) based on all or a portion of the data 210 and the quality KPIs 220.

According to the predictive analytics of steps 240, prescriptive dispatch actions can be determined. The prescriptive dispatch actions can include generating messages so that technicians are notified of a particular corrective action requiring particular tools to be performed on a particular device at a particular customer premises. The success of the corrective action can be evaluated, including based on the quality KPI's, subsequent customer care calls for the particular customer premises, or other data indicating whether the services, subsequent to the corrective action, are now satisfying the quality threshold. In one or more embodiments, the success or failure of the corrective action can be integrated with the dispatch records and the history of dispatch repair of data 210 so that subsequent predictive analytics can take this data into account when determining future corrective action for a particular configuration at a customer premises.

In one or more embodiments, the data 210 can be broken up or otherwise categorized based on other factors, such as types of services being provided, geographic regions of the customer premises, history or frequency of complaints by a user, weather conditions at time of data collection, amount of network activity at time of data collection, other anomalies at time of data collection, and so forth.

Figure 3:
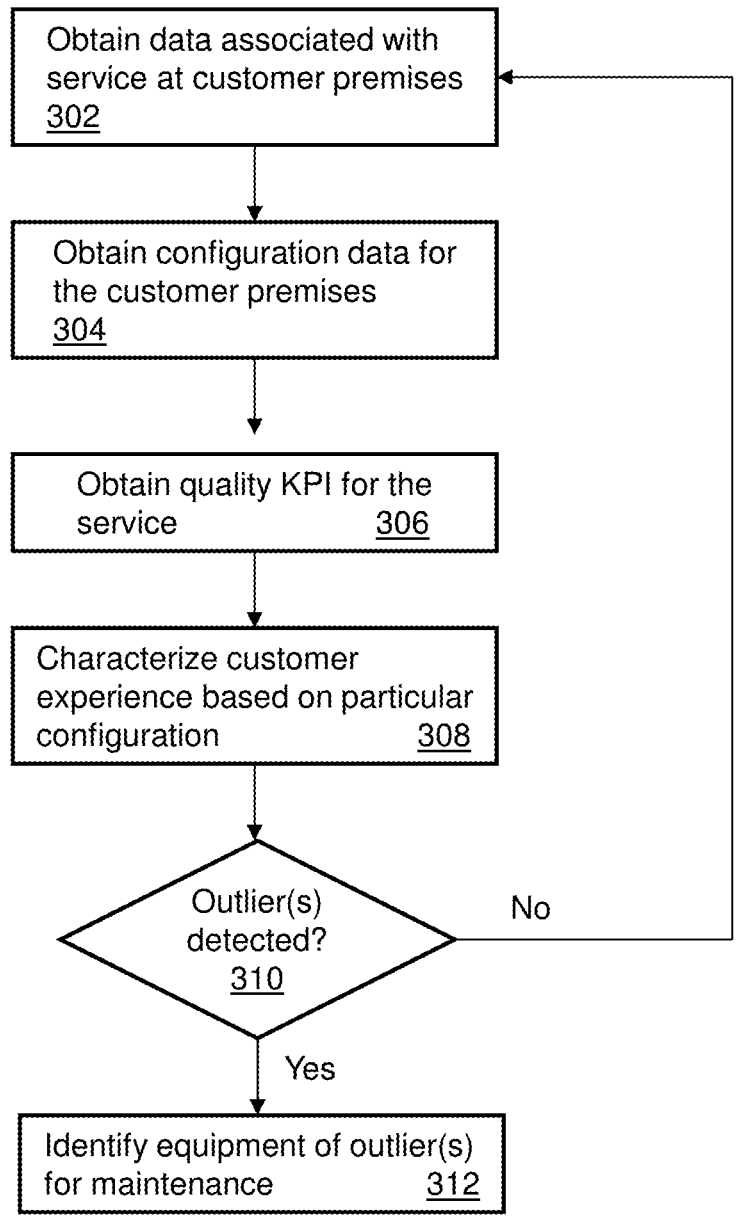
FIG. 3 depicts an illustrative embodiment of a method used in portions of the system described in FIG. 1.

FIG. 3 depicts an illustrative embodiment of a method used by system 100 to employ predictive analytics to data to determine prescriptive dispatch actions. At 302, the server 130 can obtain data associated with providing communication services to a plurality of customer premises of a plurality of users over a network. For example, the data can include device diagnostic data for a group of devices that provide the communication services to the plurality of customer premises. The data can include call records associated with maintenance for the plurality of customer premises. The data can include dispatch records associated with site visits for the plurality of customer premises. The data can include historical records associated with service performance of the plurality of customer premises.

At 304, the server 130 can obtain configuration data associated with the plurality of customer premises. At 306, the server 130 can obtain quality KPIs associated with the communication services of the plurality of customer premises. At 308, predictive analytics can be applied to all or a portion of the data to characterize or otherwise quantify a customer's experience (e.g. a desired or target experience) for a particular configuration. The predictive analytics can be used to characterize all possible configurations for the customer premises. For example, the server 130 can apply linear regression to the device diagnostic data, the call records, the dispatch records, the historical records, the configuration data and the quality KPIs to identify a quality threshold based on a particular configuration.

At 310, one or more outliers can be detected by applying data for a particular customer premises to the desired experience (i.e., the quality threshold). For instance, the server 130 can detect a subset of customer premises from among the plurality of customer premises that are not satisfying the quality threshold based on a comparison of data for each of the subset of customer premises with the quality threshold. For detected outliers, the server 130 at 312 can analyze a subset of the device diagnostic data that corresponds to the subset of customer premises to determine equipment associated with the subset of customer premises for maintenance.

In one embodiment, the server 130 can determine a history of dispatch repair for the plurality of customer premises based on the dispatch records, and can determine corrective actions for the equipment of the subset of customer premises according to the history of dispatch repair. In one embodiment, the server 130 can evaluate a success of the corrective actions for the equipment of the subset of customer premises, and can revise the dispatch records according to the evaluating.

In one embodiment, the device diagnostic data includes set top box counter data, residential gateway counter data, very-high-bit-rate digital subscriber line counter data, wireless access point counter data, or a combination thereof. In one embodiment, the group of devices includes set top boxes and residential gateways. In one embodiment, the configuration data describes a hardwire connection used by the plurality of customer premises. In one embodiment, the server 130 can determine corrective actions for the equipment of the subset of customer premises according to a history of dispatch repair, can determine tools for the corrective actions for the equipment of the subset of customer premises, and can generate a dispatch notice identifying the corrective action, the tools for the corrective actions, and a customer premises of the subset of customer premises.

Figure 4:
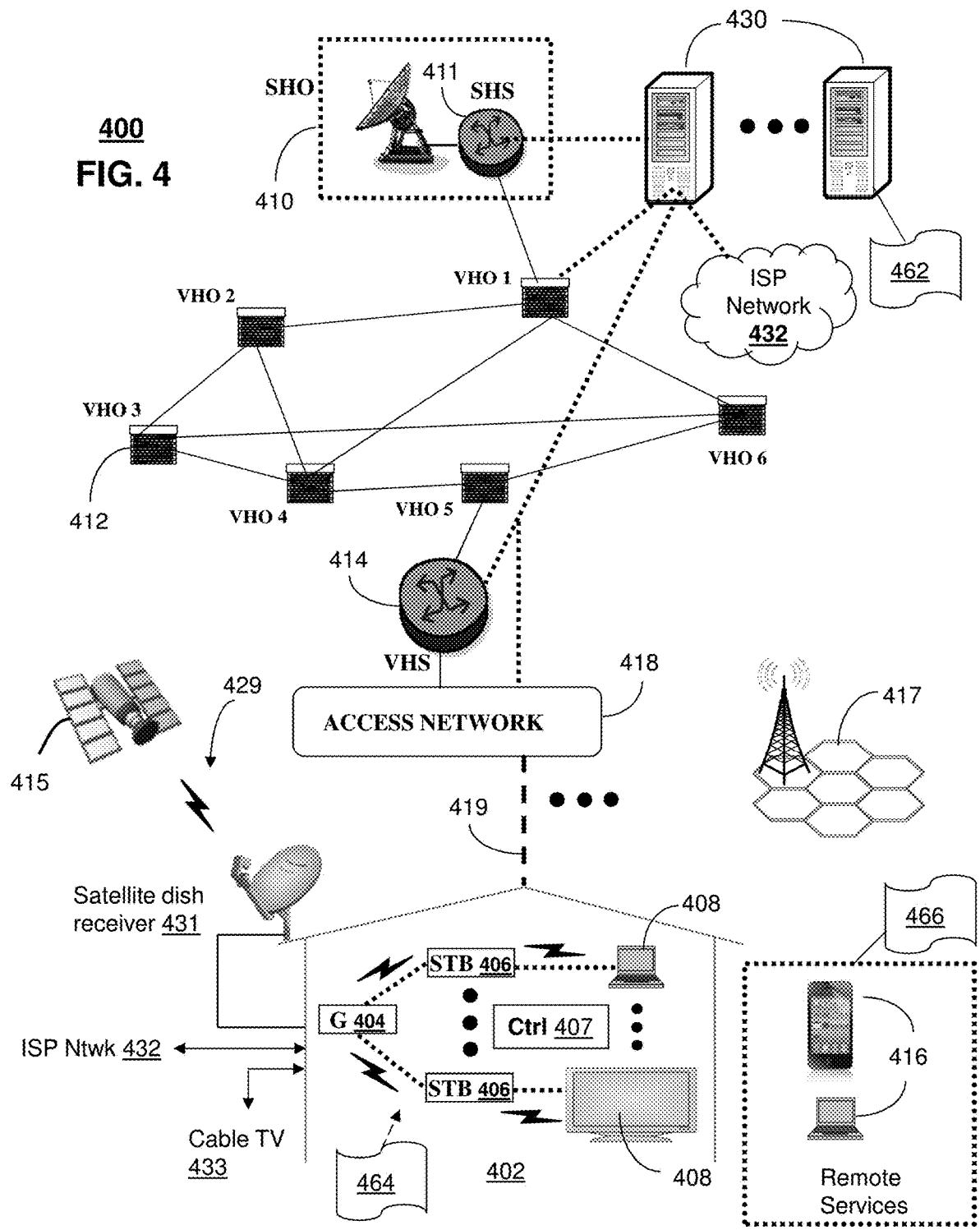
FIG. 4 depicts an illustrative embodiment of a communication system that provide media services and that enables proactive maintenance in providing those services.

FIG. 4 depicts an illustrative embodiment of a communication system 400 for delivering media content and performing predictive analytics on large datasets to enable prescriptive dispatch action for providing maintenance. The communication system 400 can represent an Internet Protocol Television (IPTV) media system. Communication system 400 can be overlaid or operably coupled with system 100 as another representative embodiment of communication system 400. For instance, one or more devices illustrated in the communication system 400 of FIG. 4 can obtain device diagnostic data for a group of devices that provide communication services to a plurality of customer premises of a plurality of users over a network; obtain dispatch records associated with site visits for the plurality of customer premises; obtain configuration data associated with the plurality of customer premises; obtain quality KPIs associated with the communication services of the plurality of customer premises; apply linear regression to the device diagnostic data, the dispatch records, the configuration data and the quality key performance indicators to identify a quality threshold based on a particular configuration; detect a subset of customer premises from among the plurality of customer premises that are not satisfying the quality threshold; analyze a subset of the device diagnostic data that corresponds to the subset of customer premises to determine equipment associated with the subset of customer premises for maintenance; evaluate a success of corrective actions for the equipment of the subset of customer premises; and revise the dispatch records according to the evaluation.

System 400 enables obtaining call records associated with maintenance for the plurality of customer premises; and obtaining historical records associated with service performance of the plurality of customer premises, where predictive analytics via the linear regression can be applied to the call records and the historical records. System 400 enables determining a history of dispatch repair for the plurality of customer premises based on the dispatch records; and determining the corrective actions for the equipment of the subset of customer premises according to the history of dispatch repair. System 400 enables the device diagnostic data to include set top box counter data, residential gateway counter data, very-high-bit-rate digital subscriber line counter data, and wireless access point counter data. System 400 enables the configuration data to describe a hardwire connection used by the plurality of customer premises.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of DSLAMs located in a central office or a service area interface that provide broadband services over fiber optical links or copper twisted pairs 419 to buildings 402. The gateway 404 can use communication technology to distribute broadcast signals to media processors 406 such as STBs which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a prescriptive maintenance dispatcher (herein referred to as server 430). The server 430 can use computing and communication technology to perform function 462, which can include among other things, one or more of the functions described with respect to server 130 of FIG. 1, including obtaining device diagnostic data for a group of devices that provide communication services to a plurality of customer premises of a plurality of users over a network; obtaining call records associated with maintenance for the plurality of customer premises; obtaining dispatch records associated with site visits for the plurality of customer premises; obtaining historical records associated with service performance of the plurality of customer premises; obtaining configuration data associated with the plurality of customer premises; obtaining quality KPIs associated with the communication services of the plurality of customer premises; applying linear regression to the device diagnostic data, the call records, the dispatch records, the historical records, the configuration data and the quality key performance indicators to identify a quality threshold based on a particular configuration; detecting a subset of customer premises from among the plurality of customer premises that are not satisfying the quality threshold; and analyzing a subset of the device diagnostic data that corresponds to the subset of customer premises to determine equipment associated with the subset of customer premises for maintenance.

The media processors 406 (and/or residential gateways 404) and wireless communication devices 416 can be provisioned with software functions 464 and 466, respectively, to utilize the services of server 430. For instance, functions 464 and 466 can include providing various data utilized in the predictive analytics of the server 130, including counter data or other information indicative of quality performance at the particular device.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
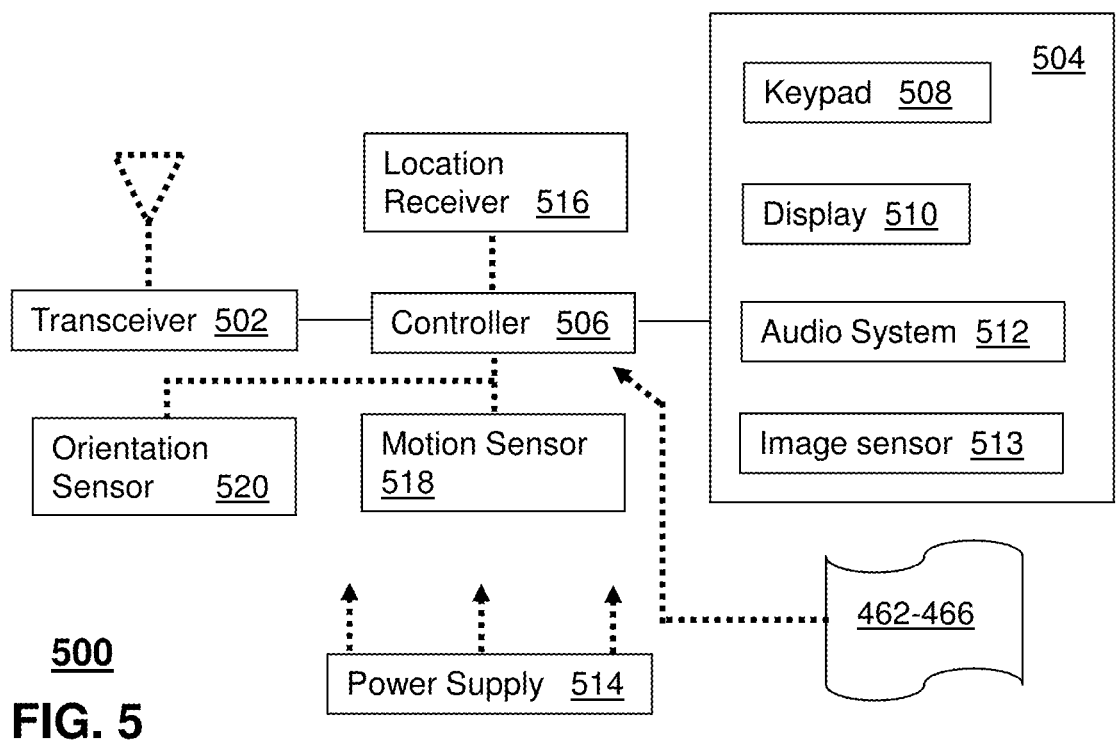
FIG. 5 depicts an illustrative embodiment of a communication device.

FIG. 5 depicts an illustrative embodiment of a communication device 500. Communication device 500 can serve in whole or in part as an illustrative embodiment of the devices depicted in FIGS. 1-2 and FIG. 4 and can be configured to perform portions of method 300 of FIG. 3. For example, communication device 500 can be a predictive maintenance dispatch server that obtains data associated with communication services provided to a plurality of customer premises of a plurality of users over a network (e.g., device diagnostic data, call records, dispatch records, and/or historical service or maintenance records); obtains configuration data associated with the plurality of customer premises; obtains quality KPIs associated with the communication services of the plurality of customer premises; applies linear regression to the data, the configuration data and the quality KPIs to identify a quality threshold based on a particular configuration; detects a subset of customer premises from among the plurality of customer premises that are not satisfying the quality threshold; and analyzes a subset of the device diagnostic data that corresponds to the subset of customer premises to determine equipment associated with the subset of customer premises for maintenance.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of the server 130 or the server 430, the media processor 406, the media devices 408, or the portable communication devices 416 of FIG. 4. It will be appreciated that the communication device 500 can also represent other devices that can operate in the systems of FIGS. 1 and/or 4 such as a gaming console and a media player. In addition, the controller 506 can be adapted in various embodiments to perform the functions 462-462.

Upon reviewing the aforementioned embodiments, it would be evident to an artisan with ordinary skill in the art that said embodiments can be modified, reduced, or enhanced without departing from the scope of the claims described below. For example, the dispatch maintenance and corrective action can be directed to provider equipment that is determined to be causing the services at the particular customer premises to fall below the desired quality threshold. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
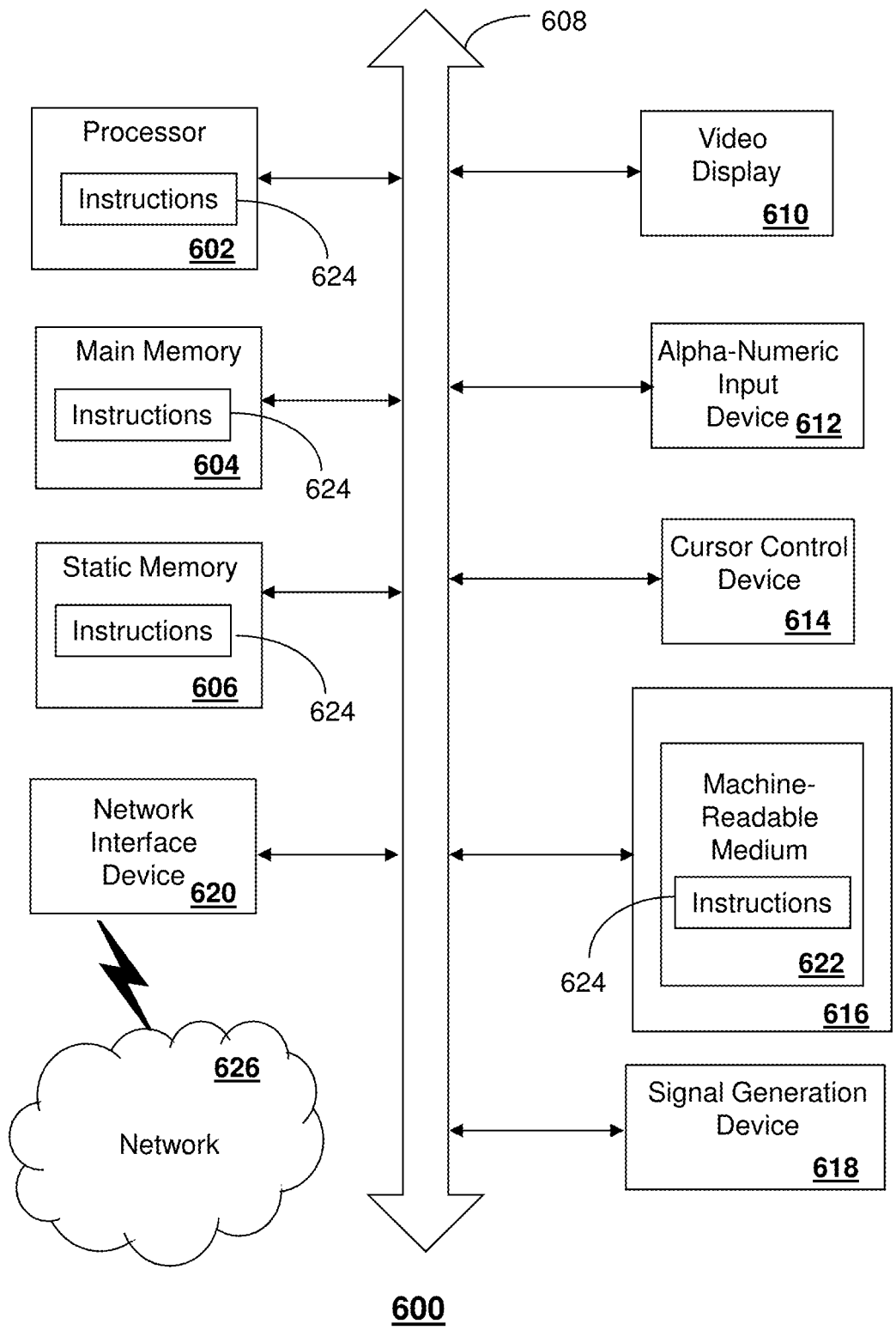
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the server 130 or server 430 to perform predictive analytics to determine prescriptive maintenance dispatch. In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein.

Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

retrieving, by a predictive maintenance dispatch server comprising a processing system including a processor, device diagnostic data from equipment of a service provider network for a group of devices that provide communication services to a plurality of customer premises of a plurality of users over a network, wherein the device diagnostic data is based on performance monitoring of the group of devices, wherein the device diagnostic data is retrieved from the group of devices via the network, and wherein the predictive maintenance dispatch server is in communication with the group of devices;

retrieving, by the predictive maintenance dispatch server from the equipment of the service provider network, call records obtained via the network and associated with maintenance for the plurality of customer premises;

retrieving, by the predictive maintenance dispatch server from the equipment of the service provider network, dispatch records obtained via the network and associated with site visits for the plurality of customer premises;

retrieving, by the predictive maintenance dispatch server from the equipment of the service provider network, historical records obtained via the network and associated with service performance of the plurality of customer premises;

retrieving, by the predictive maintenance dispatch server from the equipment of the service provider network, configuration data obtained via the network and associated with the plurality of customer premises;

retrieving, by the predictive maintenance dispatch server from the equipment of the service provider network, quality key performance indicators obtained via the network and associated with the communication services of the plurality of customer premises;

applying, by the predictive maintenance dispatch server, linear regression to the configuration data and one of the device diagnostic data, the call records, the dispatch records, the historical records and combinations thereof to obtain a linear regression result that characterizes a quality according to a particular configuration of devices of the group of devices;

identifying, by the predictive maintenance dispatch server, a quality threshold of the particular configuration based on the linear regression result in conjunction with the quality key performance indicators;

comparing, by the predictive maintenance dispatch server, the device diagnostic data to the quality threshold to obtain comparisons;

detecting, by the predictive maintenance dispatch server, a subset of customer premises from among the plurality of customer premises that are not satisfying the quality threshold based on the comparisons;

analyzing, by the predictive maintenance dispatch server, a subset of the device diagnostic data that corresponds to the subset of customer premises;

identifying, by the predictive maintenance dispatch server, equipment associated with the subset of customer premises for corrective action;

generating, by the predictive maintenance dispatch server, a notice to a technician to perform corrective action on the identified equipment, wherein the notice identifies a customer premises where the corrective action is to occur, wherein the technician performs the corrective action at the customer premises using tools specified by the predictive maintenance dispatch server;

evaluating, by the predictive maintenance dispatch server, a success of the corrective action to obtain an evaluation result, the evaluating based on the quality key performance indicators, records of customer care calls for the customer premises subsequent to the corrective action, or a combination thereof; and integrating, by the predictive maintenance dispatch server, the evaluation result with the dispatch records and the historical records, thereby facilitating determining future corrective action at the customer premises.

2. The method of claim 1, comprising:

determining, by the predictive maintenance dispatch server, a history of dispatch repair for the plurality of customer premises based on dispatch records; and determining, by the predictive maintenance dispatch server, corrective actions for the equipment of the subset of customer premises according to the history of dispatch repair.

3. The method of claim 2, comprising:

evaluating, by the predictive maintenance dispatch server, a success of the corrective actions for the equipment of the subset of customer premises; and revising, by the predictive maintenance dispatch server, the dispatch records according to the evaluating.

4. The method of claim 1, wherein the device diagnostic data includes one of set top box counter data, residential gateway counter data, very-high-bit-rate digital subscriber line counter data, wireless access point counter data and combinations thereof, and wherein the quality key performance indicators are based on one of video, broadband, voice services quality.

5. The method of claim 4, wherein the group of devices includes set top boxes and residential gateways, and wherein the quality key performance indicators are based on one of customer surveys, counters and combinations thereof.

6. The method of claim 1, wherein the configuration data describes a hardwire connection used by the plurality of customer premises, and wherein the quality key performance indicators are based on demographics of the plurality of users.

7. The method of claim 1, comprising:
  determining, by the predictive maintenance dispatch server, corrective actions for the equipment of the subset of customer premises according to a history of dispatch repair;
  determining, by the predictive maintenance dispatch server, tools for the corrective actions for the equipment of the subset of customer premises; and
  generating, by the predictive maintenance dispatch server, a dispatch notice identifying the corrective action, the tools for the corrective actions, and a customer premises of the subset of customer premises.

8. A predictive maintenance dispatch server, comprising:
  a processing system including a processor; and
  a memory that stores executable instructions that, when executed by the processing system, facilitate performance of operations, the operations comprising:
    retrieving, via network messages, a plurality of device diagnostic datasets for a group of devices that provide communication services to a plurality of customer premises of a plurality of users over a network, wherein the device diagnostic datasets are based on performance monitoring of the group of devices, and wherein the device diagnostic datasets are retrieved from the group of devices via the network;
    merging the plurality of device diagnostic datasets obtained via the network to obtain a merged device diagnostic dataset;
    retrieving, via network messages, configuration data obtained via the network and associated with the plurality of customer premises;
    retrieving quality key performance indicators obtained via the network and associated with the communication services of the plurality of customer premises;
    applying linear regression to the merged device diagnostic dataset, the configuration data and the quality key performance indicators to obtain a linear regression result that characterizes a quality according to a particular configuration of devices of the group of devices;
    identifying a quality threshold based on the linear regression result in conjunction with the particular configuration;
    detecting a subset of customer premises from among the plurality of customer premises that are not satisfying the quality threshold, based on a comparison of the merged device diagnostic dataset to the quality threshold;
    analyzing a subset of the merged device diagnostic dataset that corresponds to the subset of customer premises to identify equipment associated with the subset of customer premises for corrective action;
    determining a history of dispatch repair for the subset of the plurality of customer premises;
    determining a corrective action for the equipment of the subset of customer premises according to the history of dispatch repair;
    generating a notice to a technician to perform corrective action on the identified equipment, wherein the notice identifies a customer premises where the corrective action is to occur, wherein the technician performs the corrective action at the customer premises using tools specified by the predictive maintenance dispatch server;
    evaluating a success of the corrective action to obtain an evaluation result, the evaluating based on the quality key performance indicators, records of customer care calls for the customer premises subsequent to the corrective action, or a combination thereof; and
    integrating the evaluation result with the dispatch records and the historical records, thereby facilitating determining future corrective action at the customer premises.

9. The predictive maintenance dispatch server of claim 8, wherein the operations further comprise:
  obtaining call records associated with maintenance for the plurality of customer premises; and
  wherein the linear regression is applied to the call records.

10. The predictive maintenance dispatch server of claim 8, wherein the operations further comprise:
  evaluating a success of the corrective actions for the equipment of the subset of customer premises; and
  revising dispatch records according to the evaluating,
  wherein the linear regression is applied to the dispatch records.

11. The predictive maintenance dispatch server of claim 8, wherein the device diagnostic data includes set top box counter data, residential gateway counter data, very-high-bit-rate digital subscriber line counter data, and wireless access point counter data.

12. The predictive maintenance dispatch server of claim 8, wherein the configuration data describes a hardwire connection used by the plurality of customer premises.

13. The predictive maintenance dispatch server of claim 8, wherein the operations further comprise:
  generating a dispatch notice identifying the corrective action and a customer premises of the subset of customer premises.

14. The predictive maintenance dispatch server of claim 8, wherein the operations further comprise:
  obtaining dispatch records associated with site visits for the plurality of customer premises, wherein the linear regression is applied to the dispatch records.

15. The predictive maintenance dispatch server of claim 8, wherein the operations further comprise:
  obtaining historical records associated with service performance of the plurality of customer premises, wherein the linear regression is applied to the historical records.

16. A non-transitory, machine-readable storage medium, comprising executable instructions that, when executed by a processing system of a predictive maintenance dispatch server including a processor, facilitate performance of operations, the operations comprising:
  retrieving, from equipment of a network service provider, device diagnostic data for a group of devices that provide communication services to a plurality of customer premises of a plurality of users over a network, wherein the device diagnostic data is based on performance monitoring of the group of devices, and wherein the device diagnostic data is retrieved from the group of devices via the network;
  retrieving, from the equipment of the network service provider, dispatch records obtained via the network and associated with site visits for the plurality of customer premises;
  retrieving, from the equipment of the network service provider, configuration data obtained via the network and associated with the plurality of customer premises;
  retrieving, from the equipment of the network service provider, quality key performance indicators obtained via the network and associated with the communication services of the plurality of customer premises;

applying linear regression to the device diagnostic data, the dispatch records and the configuration data to identify a quality threshold of a particular configuration of devices of the group of devices based on the linear regression in conjunction with the quality key performance indicators;

detecting a subset of customer premises from among the plurality of customer premises that are not satisfying the quality threshold;

analyzing a subset of the device diagnostic data that corresponds to the subset of customer premises to identify equipment associated with a customer premises of the subset of customer premises for corrective action;

generating a notice to a technician to perform corrective action on the identified equipment, wherein the notice identifies the customer premises where the corrective action is to occur, wherein the technician performs the corrective action at the customer premises using tools specified by the predictive maintenance dispatch server;

evaluating a success of the corrective action for the equipment associated with the customer premises to obtain an evaluation result, the evaluating based on the quality key performance indicators, records of customer care calls for the customer premises subsequent to the corrective action, or a combination thereof;

integrating the evaluation result with the dispatch records and the historical records, thereby facilitating determining future corrective action at the customer premises; and revising the dispatch records according to the evaluating.

17. The non-transitory, machine-readable storage medium of claim 16, wherein the operations further comprise:

obtaining call records associated with maintenance for the plurality of customer premises; and obtaining historical records associated with service performance of the plurality of customer premises, wherein the linear regression is applied to the call records and the historical records.

18. The non-transitory, machine-readable storage medium of claim 17, wherein the operations further comprise:

determining a history of dispatch repair for the plurality of customer premises based on the dispatch records; and determining corrective actions for the equipment of the subset of customer premises according to the history of dispatch repair.

19. The non-transitory, machine-readable storage medium of claim 17, wherein the device diagnostic data includes set top box counter data, residential gateway counter data, very-high-bit-rate digital subscriber line counter data, and wireless access point counter data.

20. The non-transitory, machine-readable storage medium of claim 17, wherein the configuration data describes a hardwire connection used by the plurality of customer premises.

* * * * *